US007543755B2

(12) United States Patent
Doi et al.

(10) Patent No.: US 7,543,755 B2
(45) Date of Patent: Jun. 9, 2009

(54) ELECTRONIC KEY, ELECTRONIC LOCKING APPARATUS, ELECTRONIC SECURITY SYSTEM, AND KEY ADMINISTERING SERVER

(75) Inventors: Kenji Doi, Nara (JP); Takashi Nishiyama, Takarazuka (JP); Ryouji Nakajima, Hirakata (JP); Masaru Hashimoto, Osaka (JP); Kenshi Suzuki, Toyono-cho (JP); Yoshiko Tsuji, Hikone (JP); Tokuhisa Nishimura, Shijonawate (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 1480 days.

(21) Appl. No.: 10/329,927

(22) Filed: Dec. 27, 2002

(65) Prior Publication Data

US 2003/0122651 A1 Jul. 3, 2003

(30) Foreign Application Priority Data

Dec. 28, 2001 (JP) ............................ 2001-401544

(51) Int. Cl.
*G06K 19/05* (2006.01)

(52) U.S. Cl. ...................................... 235/492; 235/382

(58) Field of Classification Search ................. 235/492, 235/487, 380, 382, 382.5, 444, 446, 451, 235/472.01–472.02
See application file for complete search history.

(56) References Cited

U.S. PATENT DOCUMENTS

| | | | | |
|---|---|---|---|---|
| 4,594,637 | A * | 6/1986 | Falk | 361/172 |
| 4,777,555 | A * | 10/1988 | Esculpavit et al. | 361/111 |
| 4,864,115 | A * | 9/1989 | Imran et al. | 235/492 |
| 4,988,987 | A * | 1/1991 | Barrett et al. | 340/5.28 |
| 5,838,251 | A | 11/1998 | Brinkmeyer et al. | |
| 6,331,812 | B1 | 12/2001 | Dawalibi | |
| 6,580,356 | B1 | 6/2003 | Ait et al. | |

FOREIGN PATENT DOCUMENTS

| | | |
|---|---|---|
| DE | 19527488 | 2/1996 |
| DE | 10065503 | 6/2001 |
| EP | 0843425 | 5/1998 |
| EP | 1033687 | 9/2000 |
| JP | 2000145219 | 5/2000 |

OTHER PUBLICATIONS

English Language Abstract for JP Appln. No. 2000-145219.
English Language Abstract of DE 19527488.

* cited by examiner

*Primary Examiner*—Daniel St.Cyr
(74) *Attorney, Agent, or Firm*—Greenblum & Bernstein, P.L.C.

(57) ABSTRACT

An electronic security system is provided with an electronic key and an electronic locking apparatus. The electronic key includes an identification data registry for storing one or more identification data for locking and unlocking. The electronic locking apparatus includes a key data registry for storing a key data having a predetermined relationship with an identification data of an electronic key corresponding to the electronic locking apparatus. The system includes with a reader/writer for reading and writing the identification data in and from the identification data registry. This system ensures an improved convenience by making a single key compatible with a plurality of objects.

23 Claims, 14 Drawing Sheets

ELECTRONIC KEY, ELECTRONIC LOCKING APPARATUS, ELECTRONIC SECURITY SYSTEM, AND KEY ADMINISTERING SERVER

BACKGROUND OF THE INVENTION

This invention relates to an electronic key, an electronic locking apparatus, an electronic security system, and a key administering server.

Generally, keys owned by one individual include keys compatible with a plurality of kinds of objects (facilities and equipments) such as a house key, a car key, a key for workplace and a safe key. This is the present situation that a plurality of keys are carried around while being attached to a key holder.

If one individual owns a plurality of keys as mentioned above, it is difficult to understand which key corresponds which object and the object cannot be unlocked unless the respective keys are successively tried, which is very inconvenient. If name cards are attached to the respective keys, a correspondence between the keys and the objects can be clarified. However, if the number of the keys increases, they are bulky and it is inconvenient to carry them around.

SUMMARY OF THE INVENTION

It is an object of the present invention to provide a security technology which has overcome the problems residing in the prior art.

It is another object of the present invention to provide an electronic key, an electronic locking apparatus, an electronic security system, and a key administering server which have an improved convenience by making a single key compatible with a plurality of objects and a better portability.

According to an aspect of the present invention, an electronic key stores an identification data for locking and unlocking an electronic locking apparatus. The identification data is externally inputted via an interface. One or more identification data for locking and unlocking is inputted and registered in a storage of such an electronic key. A single electronic key can deal with a plurality of electronic locking apparatus.

An electronic locking apparatus according to another aspect of the present invention effects locking and unlocking if identification data from an electronic key satisfies a predetermined condition with a key data stored in a key data registry thereof. Locking and unlocking are performed based on the identification data satisfying the predetermined condition with the key data. Thus, locking and unlocking can be performed even if a plurality of identification data are received from the electronic key.

An electronic security system according to still another aspect of the present invention is provided with an electronic key, an electronic locking apparatus, and a reader/writer for reading and writing an identification data in and from the electronic key. This electronic security system enables the identification data of the electronic key to be read and written by the reader/writer.

A key administering server according to further another aspect of the present invention is provided with a key database in which an identification data for locking and unlocking and an identifier for regulating reading and writing of identification data is stored in pair. A user of the electronic key and an owner of the electronic locking apparatus can obtain the identification data from such a key administering server.

These and other objects, features, aspects, and advantages of the present invention will become more apparent from the following detailed description of the preferred embodiments/examples with reference to the accompanying drawings.

DETAILED DESCRIPTION OF THE PREFERRED EMBODIMENTS OF THE INVENTION

Referring to FIGS. 1 to 8, an electronic security system in accordance with an embodiment of the invention will be described. In this electronic security system, an electronic key 10 in which an identification data is registered is attached to a person M. An object Ob, such as house, provided with a locking mechanism 29 is mounted with a touch electrode 21 touchable by the person M. The touch electrode 21 is provided on an electronic locking apparatus 20 for receiving the identification data from the electronic key 10. When the person M touches the touch electrode 21, a transmission path via the person M is formed between the electronic key 10 and the electronic locking apparatus 20 and the identification data is transmitted from the electronic key 10 to the electronic locking apparatus 20 via the person M. The identification data are differed depending on the respective objects Ob.

Figure 2:
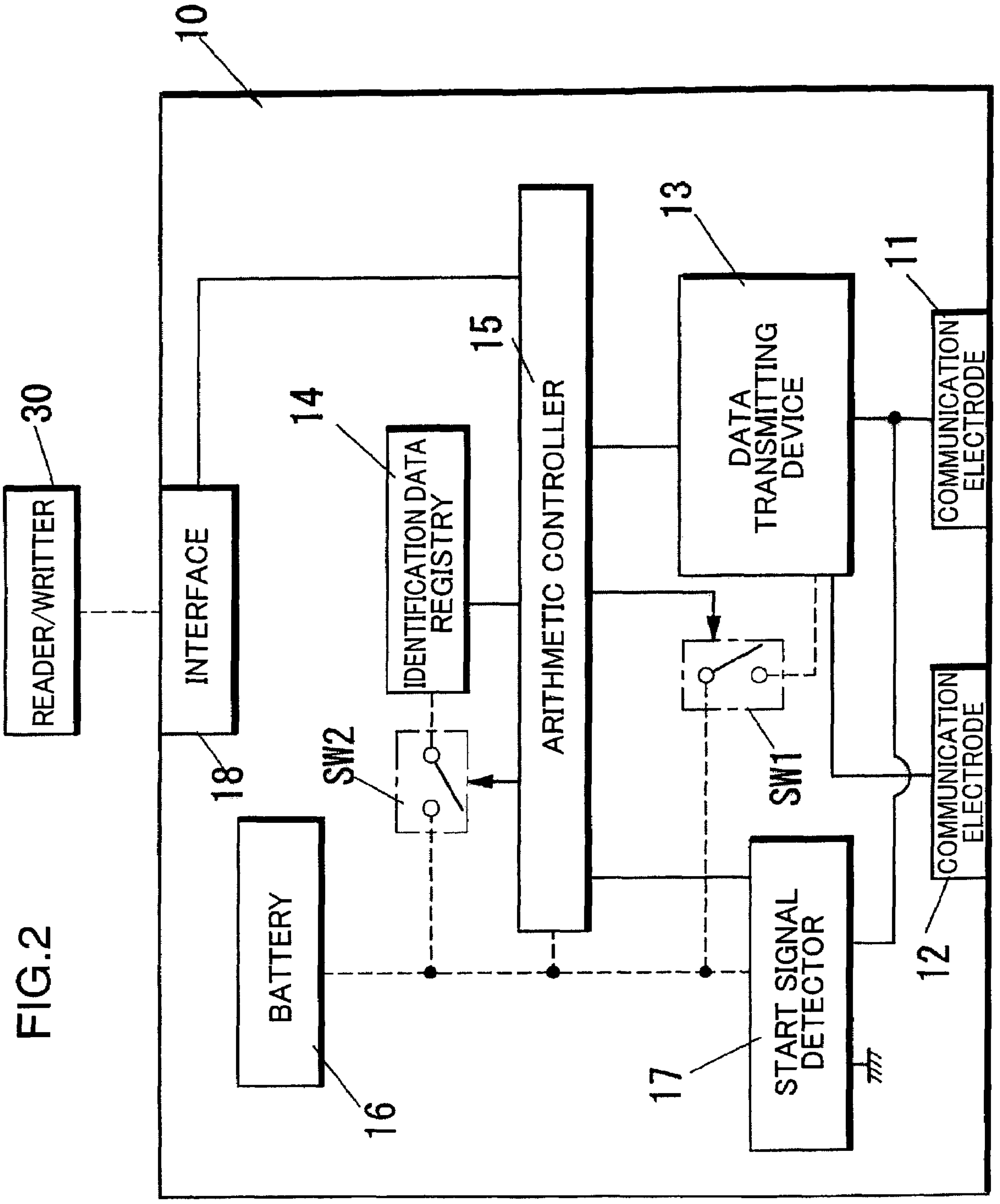
FIG. 2 is a block diagram showing a construction of an electronic key used in the system.
Figure 6:
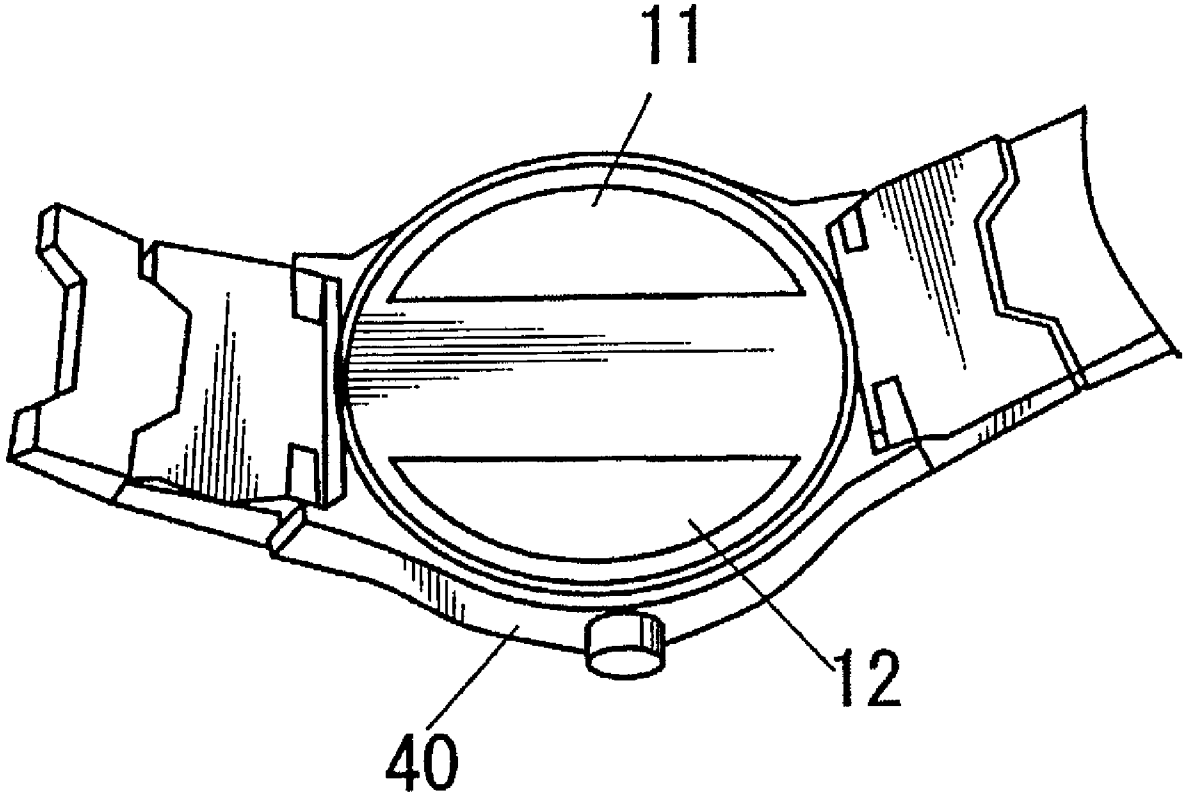
FIG. 6 is a perspective view showing an external configuration of the electronic key.

In this embodiment, the data transmitted between the electronic key 10 and the electronic locking apparatus 20 is modulated and, for example, an ASK modulation method using an alternating-current signal as a carrier is adopted. The electronic key 10 has, for example, a wristwatch-shaped casing 40 as shown in FIG. 6, and one surface of the casing 40 directly touches the person M when the electronic key 10 is worn. The electronic key 10 is, as shown in FIG. 2, provided with two communication electrodes 11, 12 on the surface of the casing 40 which directly touches the person M. The two communication electrodes 11, 12 are connected with a data transmitting device 13. The electronic key 10 is provided with an identification data registry 14 including a nonvolatile memory capable of storing a plurality of identification data.

The identification data stored in the identification data registry 14 are read from the identification data registry 14 by an arithmetic controller 15 including a microcomputer and, are applied to the communication electrodes 11, 12 after being modulated by the ASK modulation method by the data transmitting device 13. The electronic key 10 includes an interface 18, so that the identification data can be read from and written in the identification data registry 14 via the interface 18. The interface 18 is connectable with a reader/writer 30 to be described later, and the identification data are read from and written in the identification data registry 14 by the reader/writer 30.

Since a power supply of the electronic key 10 is a battery 16 which is relatively small power capacity, the electronic key 10 has two modes: a normal mode in which the electronic key 10 is normally operated and a standby mode in which power consumption is smaller than normal operation period. The standby mode is set while the person M is not touching the touch electrode 21 provided on the electronic locking apparatus 20, thereby suppressing the power consumption. Specifically, switching elements SW1, SW2 controllably opened and closed by the arithmetic controller 15 are provided in power supply paths from the battery 16 to the data transmitting device 13 and the identification data registry 14. In the standby mode, the arithmetic controller 15 turns the switching elements SW1, SW2 off and enters a so-called sleep mode, whereby all the functions of the arithmetic controller 15 except those necessary to start are stopped. It should be noted that broken lines in FIGS. 2 and 3 show power supply paths.

Since, in the standby mode, no power is supplied to the data transmitting device 13 and the arithmetic controller 15 is in the sleep mode, a start signal detector 17 is provided separately from the data transmitting device 13 to detect the contact of the person M with the touch electrode 21. The start signal detector 17 is connected with the communication electrodes 11 and 12 (or a ground circuit of the electronic key 10). Thus, when the person M wearing the electronic key 10 touches the touch electrode 21 of the electronic locking apparatus 20, the start signal detector 17 starts the arithmetic controller 15 upon receiving a start signal to be described later from the electronic locking apparatus 20. When the arithmetic controller 15 is started, the electronic key 10 enters the normal mode, whereupon the arithmetic controller 15 turns the switching elements SW1, SW2 on to supply power from the battery 16 to the data transmitting device 13 and the identification data registry 14. A timer is built in the arithmetic controller 15. Upon the start of the normal mode, the timer starts a time measuring operation, and the arithmetic controller 15 returns to the standby mode upon the completion of the time measuring operation by the timer. The period fixed by the timer, i.e., one operation period of the normal mode is set at a time required for the electronic key 10 to receive the identification data from the electronic locking apparatus 20.

Figure 3:
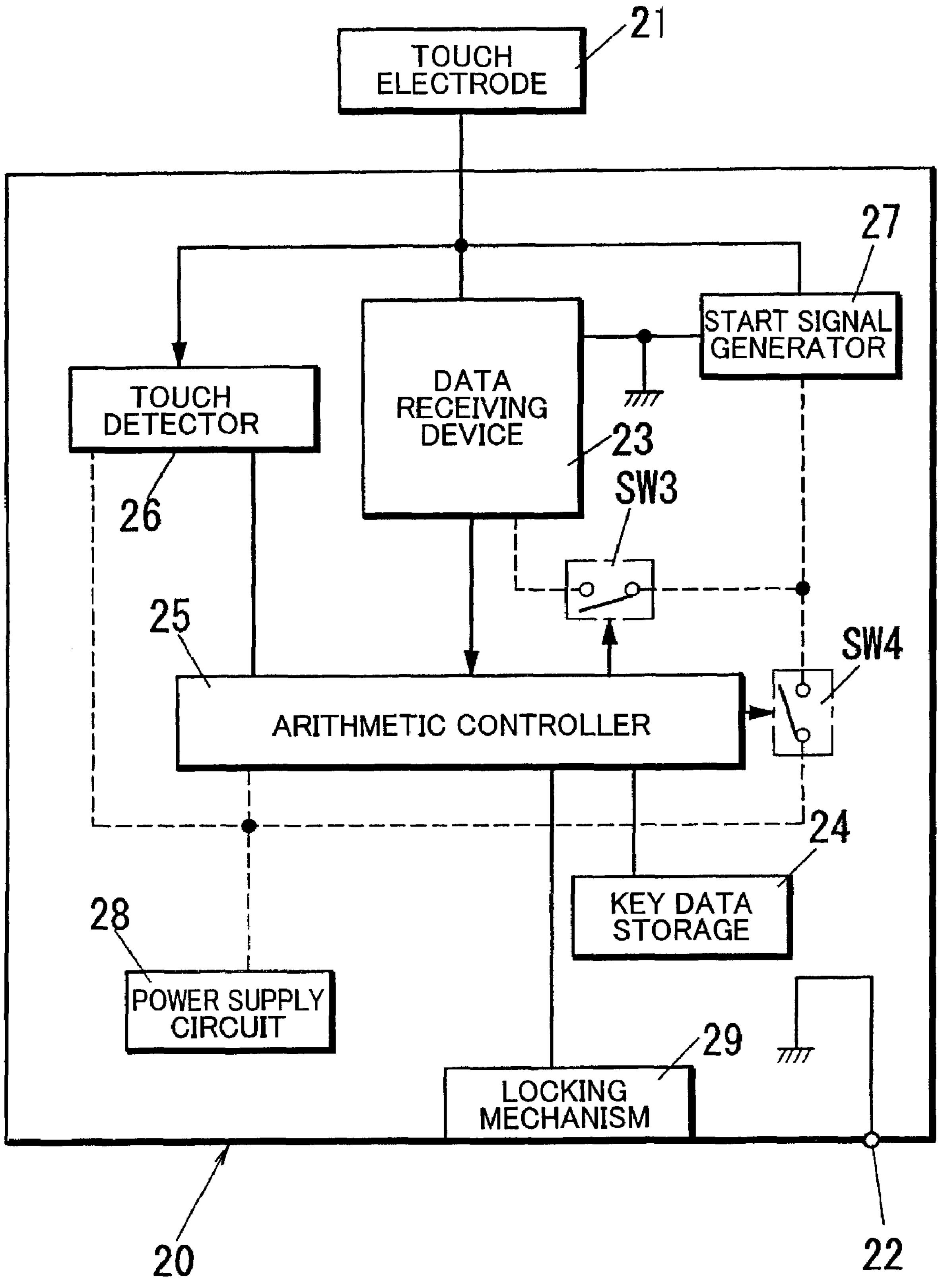
FIG. 3 is a block diagram showing a construction of an electronic locking apparatus used in the system.
Figures 5A, 5B, 5C:
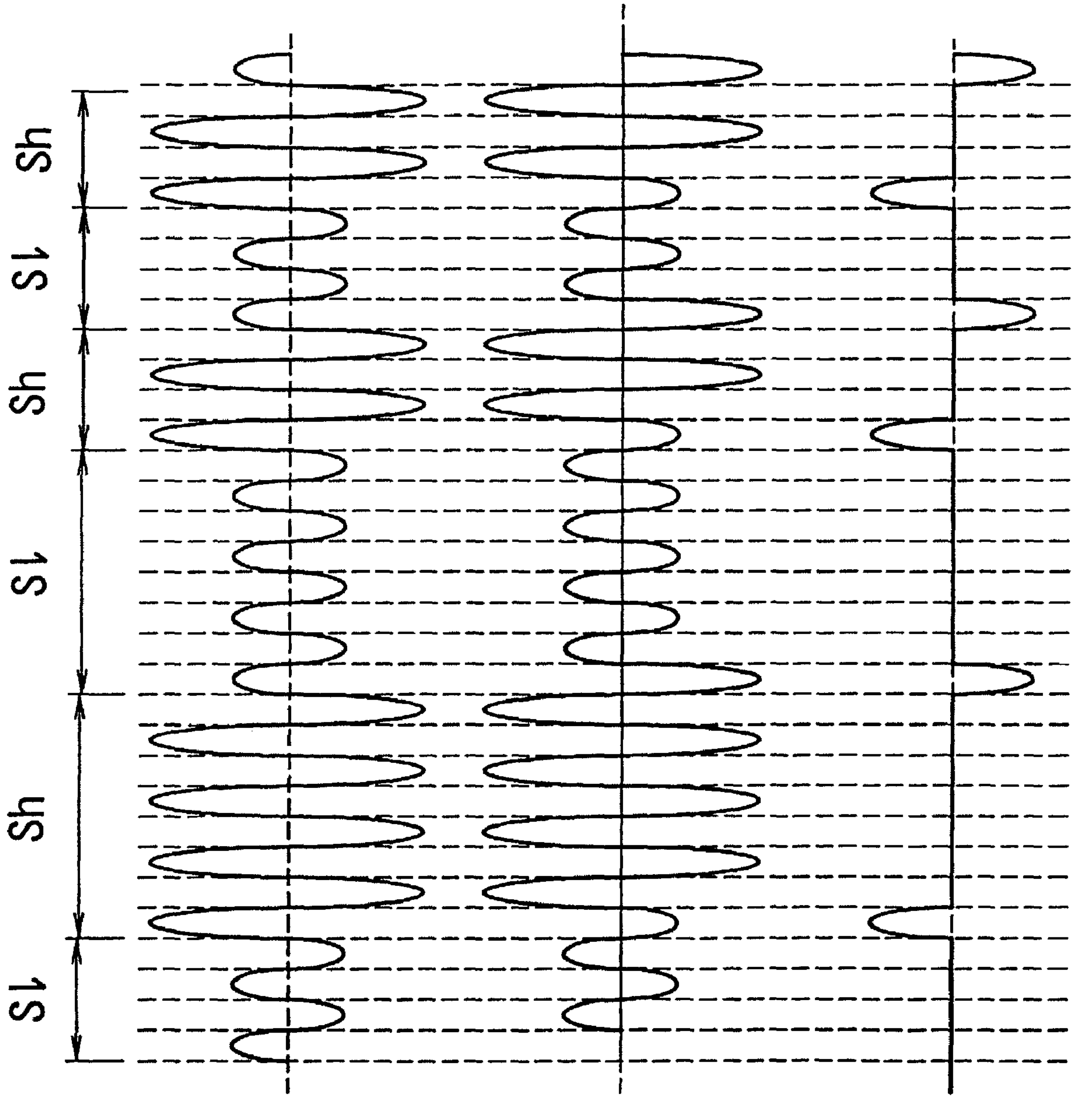
FIGS. 5A to 5C are charts showing generation of signals for identification.

On the other hand, the electronic locking apparatus 20 is provided with the touch electrode 21 and a ground terminal 22 to be connected with a ground circuit as shown in FIG. 3. The touch electrode 21 is connected with a data receiving device 23. The data receiving device 23 includes a noise remover for removing noise components by, after having only frequency components corresponding to the carrier of the modulated signal extracted from a voltage applied between the touch electrode 21 and the ground terminal 22 by means of a band filter, equally dividing an output of the band filter into two signals of different types, delaying the phase of one of the equally divided signal from that of the other by 180°, and adding the undelayed signal and the delayed signal. Specifically, since the modulated signal from the electronic key 10 is modulated by the ASK modulation method in this embodiment, the voltage applied between the touch electrode 21 and the ground terminal 22 has a period Sh during which amplitude is higher (hereinafter, referred to as H-period) and a period Sl during which amplitude is lower (hereinafter, referred to as L-period) as shown in FIG. 5A (waveform after passing the band filter is assumed in the shown example). Since the signal components during the L-period include noise components, it is necessary to extract the signal components by removing the noise components in order to extract the identification data from the modulated signal.

As a technique of removing the noise components, it may be thought to set a threshold value for the voltage to be applied between the touch electrode 21 and the ground terminal 22. Since the noise components largely vary depending on various conditions (degree of sweating, materials and arrangements of members attached around the person), it is difficult to completely separate the signal components from the noise components if a specific value is set as the threshold value. Accordingly, in this embodiment, the signal applied between the touch electrode 21 and the ground terminal 22 is equally divided into two signals of different types, and the phase of one signal is delayed from that of the other signal (signal of the same phase as in FIG. 5A) by 180°, and a signal as shown in FIG. 5C is created by adding these two signals. Specifically, an absolute value of the amplitude differs during a half cycle located at the beginning of the H-period Sh and a half cycle located at the beginning of the L-period Sl as can be seen from a comparison of the amplitudes of the signals shown in FIGS. 5A and 5B in every half cycle. In other words, the amplitude of the undelayed signal is larger than that of the delayed signal during the half cycle at the beginning of the H-period Sh, whereas the amplitude of the delayed signal is larger than that of the undelayed signal during the half cycle at the beginning of the L-period Sl. If the H-period Sh is so specified as to start in the positive half cycle (i.e., upper half cycle in FIG. 5) and end in the negative half cycle (i.e., lower half cycle in FIG. 5), a positive signal can be taken out at the beginning of the H-period Sh and a negative signal can be taken out at the beginning of the L-period Sl as shown in FIG. 5C. In order to take out similar signals, the voltage applied between the touch electrode 21 and the ground terminal 22 may be differentiated after having an envelop thereof detected. Alternatively, the positive and negative signals may be taken out at the reversed timings, or subtraction may be applied to the delayed signal and undelayed signal instead of addition.

If the signals are extracted at the beginnings of the H-period Sh and the L-period Sl as described above, and a signal of H-level can be generated in accordance with the signal representing the beginning of the H-period Sh and a signal of L-level can be generated in accordance with the signal representing the beginning of the L-period Sl, the identification data can be transmitted from the electronic key 10.

As described above, the electronic key 10 receives the start signal to proceed from the standby mode to the normal mode when the person M touches the touch electrode 21. Thus, the electronic locking apparatus 20 needs to send the start signal from the touch electrode 21 when the person M touches the touch electrode 21. In the electronic locking apparatus 20 of this embodiment, the touch electrode 21 is connected with a touch detector 26 to detect the contact of the person M with the touch electrode 21. The touch detector 26 functions similar to a known touch switch and, upon detecting the contact of the person M with the touch electrode 21, notifies it to an arithmetic controller 25. A known touch sensor technique is used for the touch detector 26 of this type. The known technique of this type is, for example, such that a peripheral electrode is formed around the touch electrode 21, a planar capacitor is formed by the touch electrode 21 and the peripheral electrode, and the contact of the person M is detected by a change in the capacity of the planar capacitor by the approach of the body of the person M to the touch electrode 21. When the touch detector 26 detects the contact of the person M with the touch electrode 21, the arithmetic controller 25 starts a start signal generator 27 connected with the touch electrode 21 to cause it to send a start signal to the electronic key 10 worn by the person M touching the touch electrode 21. The start signal used is, for example, a sine-wave signal of a specified amplitude.

The electronic locking apparatus 20 is provided with a power supply circuit 28. The power supply circuit 28 is connected with a commercial power source in the case of installing the electronic locking apparatus 20 in a house Ob1 while being connected with a battery in the case of installing the electronic locking apparatus 20 in a car Ob2. Switching elements SW3, SW4 are provided in power supply paths from the power supply circuit 28 to the data receiving device 23 and the start signal generator 27, respectively. These switching elements SW3, SW4 are controllably opened and closed by the arithmetic controller 25. The arithmetic controller 25 has a sleep mode in which all the functions thereof except those necessary to start when the touch detector 26 detects the contact of the person M with the touch electrode 21 are stopped, and cancels this sleep mode when the touch detector 26 detects the contact of the person M with the touch electrode 21. Further, the arithmetic controller 25 has a built-in timer for starting its time measuring operation upon the cancellation of the sleep mode, and causes the start signal to be generated by turning the switching elements SW3, SW4 on only during the time measuring operation of the timer and, thereafter, demodulates the received modulated signal in the data receiving device 23. The period fixed by the timer is set at a time required to receive the identification data.

Figure 1:
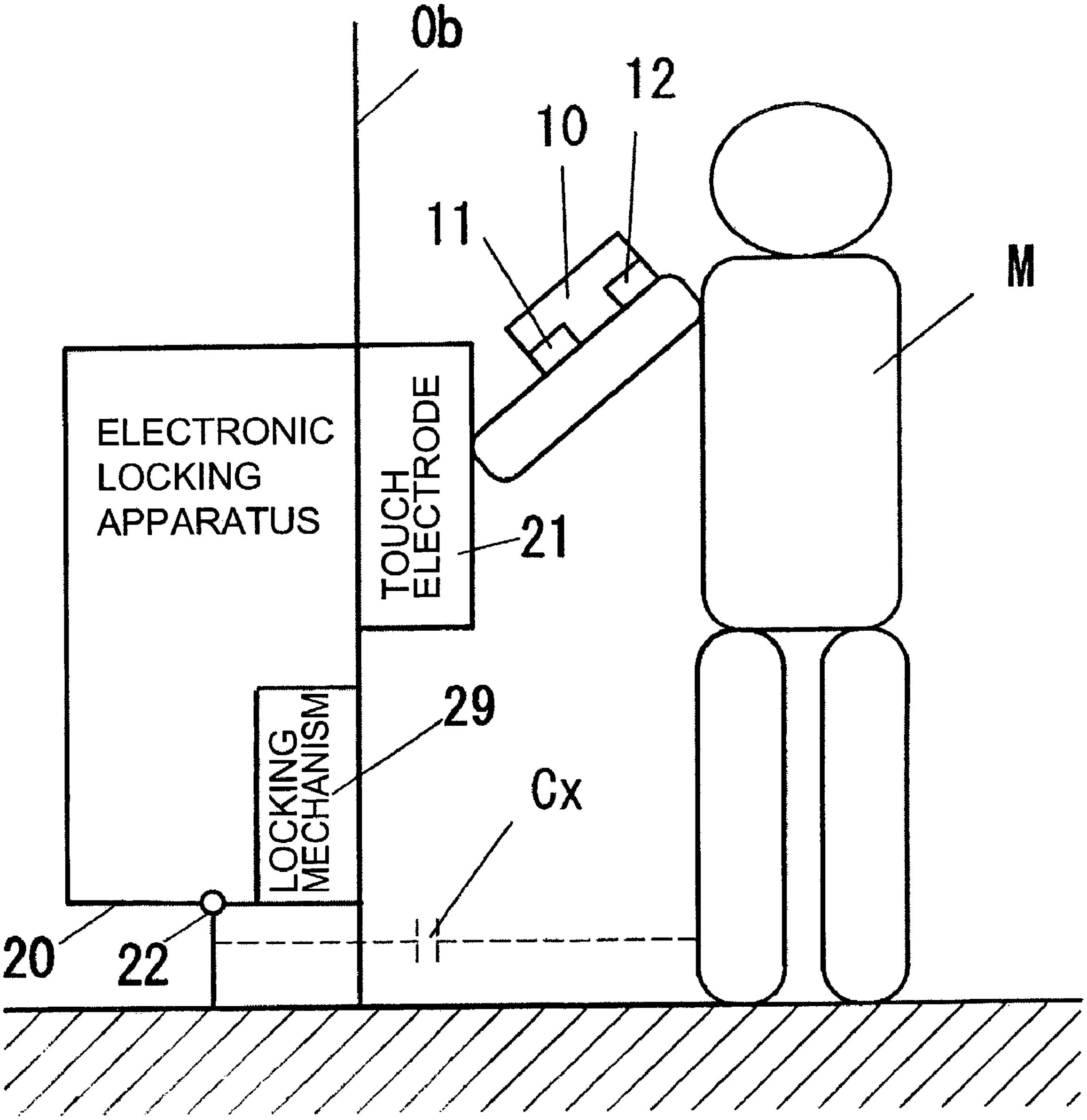
FIG. 1 is a schematic diagram conceptually showing a construction of an electronic security system embodying the invention.

The electronic key 10 and electronic locking apparatus 20 described above function as follows. The electronic key 10 is, as shown in FIG. 1, attached to the person M such that one of the communication electrodes 11, 12 of the electronic key 10 is located at the wrist side while the other thereof is located at the shoulder side. When a fingertip or a hand of the person M touches the touch electrode 21 provided on the electronic locking apparatus 20, the person M between the communication electrode 11 and the touch electrode 21 functions as a transmission path, and the communication electrode 12 and the ground terminal 22 are coupled via an impedance Zx (impedance Z1 at the interface between the communication electrode 12 and the person M+impedance Z2 of the person M+impedance Z3 (capacity component Cx) between the person M and the ground terminal 22) including the person M. In other words, a relatively small looped path of the impedance Zx is formed between the electronic key 10 and the electronic locking apparatus 20, thereby enabling the modulated signal sent from the electronic key 10 to be received by the electronic locking apparatus 20. The capacity component Cx largely varies depending on a distance between the ground terminal 22 and the person M and surroundings. Further, the impedance Zx of the transmission path largely varies depending on not only the size of the capacity component Cx, but also a degree of sweating of the person M. Thus, the impedance Zx is designed such that the upper limit of a current flowing into the person M is, for example, smaller than 500 μA.

Since the person M is used as one electrode of the capacity component Cx, if the area of a conductor connected with the communication electrode 12 is assumed to be constant, the impedance Z1 at the interface between the communication electrode 12 and the person M is smaller as compared to a case where the communication electrode 12 is not directly touching the person M. Thus, the impedance Zx between the communication electrode 12 and the ground terminal 22 decreases, with the result that the electronic key 10 can transmit the identification data to the electronic locking apparatus 20 with a relatively small energy. The ground terminal 22 of the electronic locking apparatus 20 is grounded at a suitable position of the object Ob.

The electronic locking apparatus 20 is provided with the locking mechanism 29 for locking and unlocking the object Ob. The locking mechanism 29 used includes, for example, a dead bolt, and locks and unlocks the object Ob by moving the dead bolt forward and backward by means of a motor or a solenoid. The locking mechanism 29 of this type is adopted in an electronic lock. The arithmetic controller 25 is provided with a data storage 24 in which key data having a relationship satisfying a specified condition with the identification data transmitted from the electronic key 10 are registered. The relationship satisfying the specified condition with the identification data means that the key data coincides with the identification data and that a specified value can be obtained by combining the key data and the identification data in accordance with a predetermined rule. The arithmetic controller 25 locks or unlocks the locking mechanism 29 when the identification data transmitted from the electronic key 10 and the key data stored in the key data storage 24 satisfy the specified condition. Whether the locking mechanism 29 locks or unlock the object Ob depends on the state of the locking mechanism 29 when the key data is inputted. Specifically, the locking mechanism 29 locks the object Ob if it is not locked while unlocking the object Ob if it is locked. Since a plurality of identification data can be registered in the electronic key 10 as described above, the locking mechanism 29 locks or unlocks the object Ob when any one of the identification data registry in the electronic key 10 and the key data satisfy the specified condition. The key data storage 24 may be so constructed as to make the key data unchangeable using a mask ROM, a DIP switch, a jumper switch, a circuit pattern, etc. However, the key data may be made changeable using a nonvolatile memory.

The locking/unlocking operation of the electronic locking apparatus 20 described above is described. First, when the person M wearing the electronic key 10 touches the touch electrode 21, the touch detector 26 cancels the sleep mode of the arithmetic controller 25 provided in the electronic locking apparatus 20, and power is supplied from the power supply circuit 28 to the data receiving device 23 and the start signal generator 27. Upon the power supply to the start signal generator 27, a start signal is sent from the touch electrode 21 and inputted to the communication electrode 11 in the electronic key 10. In the electronic key 10, when the start signal detector 17 detects the start signal, the sleep mode of the arithmetic controller 15 is canceled, whereby power is supplied from the battery 16 to the data transmitting device 13 and the identification data registry 14. Further, the timer built in the arithmetic controller 15 starts the time measuring operation. Upon the power supply to the identification data registry 14, the identification data is read from the identification data registry 14 and inputted via the arithmetic controller 15 to the data transmitting device 13, which in turn sends a modulated signal representing the identification data via the communication electrode 11.

In the electronic locking apparatus 20, after the start signal is sent, the timer built in the arithmetic controller 25 starts its time measuring operation and the data receiving device 23 waits on standby to receive the modulated signal. Specifically, the electronic locking apparatus 20 enters such a state as to wait for the reception of the modulated signal and, upon receiving the modulated signal, causes the data receiving device 23 to demodulate the received signal and compares the demodulated identification data with the key data. The arithmetic controller 25 instructs the locking mechanism 29 to lock or unlock the object Ob if the identification data and the key data satisfy the specified condition as described above, whereas the locking mechanism 29 neither locks or unlocks if the specified condition is not satisfied.

The arithmetic controllers 15, 25 of the electronic key 10 and the electronic locking apparatus 20 cause the timers to start their time measuring operations after the input of the start signals and, after the transmission of the identification data is completed, enter the sleep mode again by completing the time measuring operations of the timers.

Since a data transmission direction between the electronic key 10 and the electronic locking apparatus 20 is unilateral, i.e., only from the electronic key 10 to the electronic locking apparatus 20, the electronic key 10 cannot return a confirmation response to the electronic locking apparatus 20. Accordingly, it is desirable to send the modulated signals of the same content to the electronic locking apparatus 20 a plurality of times and to use the data having no error detected therein in the electronic locking apparatus 20.

Figure 4:
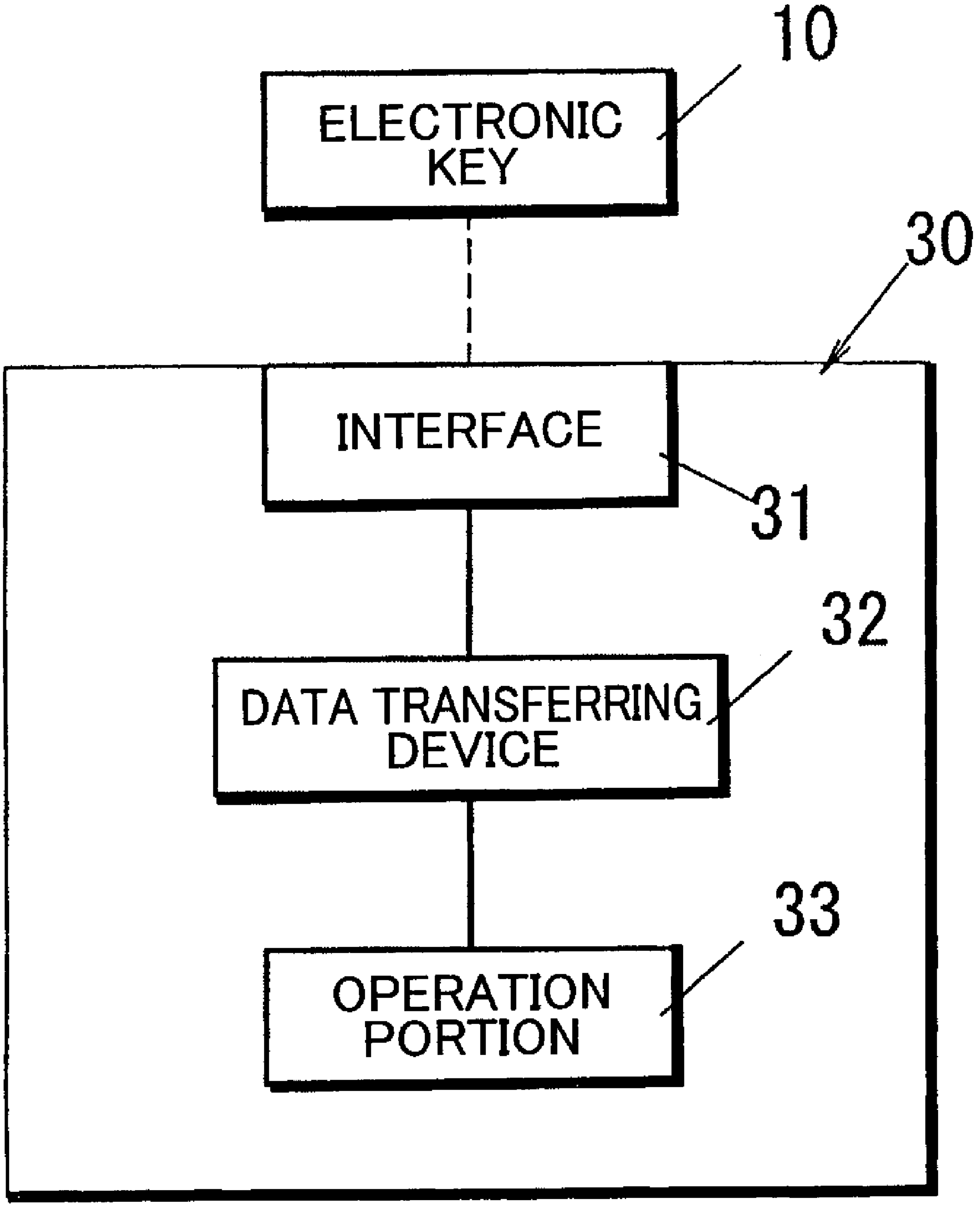
FIG. 4 is a block diagram showing a construction of a reader/writer used in the system.

In order to enable the identification data to be read from and written in the identification data registry 14 of the electronic key 10, the reader/writer 30 is connectable with the interface 18 as described above. The reader/writer 30 is, as shown in FIG. 4, provided with an interface 31 connectable with the interface 18 of the electronic key 10, and a data transferring device 32 for reading and writing the identification data from and in the identification data registry 14 is connected with the interface 31. A memory is built in the data transferring device 32, so that the identification data read from the electronic key 10 can be stored. Further, the reader/writer 30 is provided with an operation portion 33 including a push button for instructing the data transferring device 32 to read and write the identification data. In the case of providing one push button as the operation portion 33, the identification data is read from the electronic key 10 by the first pushing operation, and the identification data stored in the data transferring device 32 is written in the electronic key 10 when the operation portion 33 is pushed for the second time within a predetermined period after the operation portion 33 is pushed for the first time. Alternatively, in the case of providing two push buttons as the operation portion 33, one push button is used to instruct the reading while the other is used to instruct the writing. If a read instruction is given by the operation portion 33, a read command is sent from the reader/writer 30 to the electronic key 10 and, upon the input of the read command, the arithmetic controller 15 of the electronic key 10 transfers the identification data to the reader/writer 30. All the identification data are read if a plurality of identification data are registered in the identification data registry 14.

Figure 7:
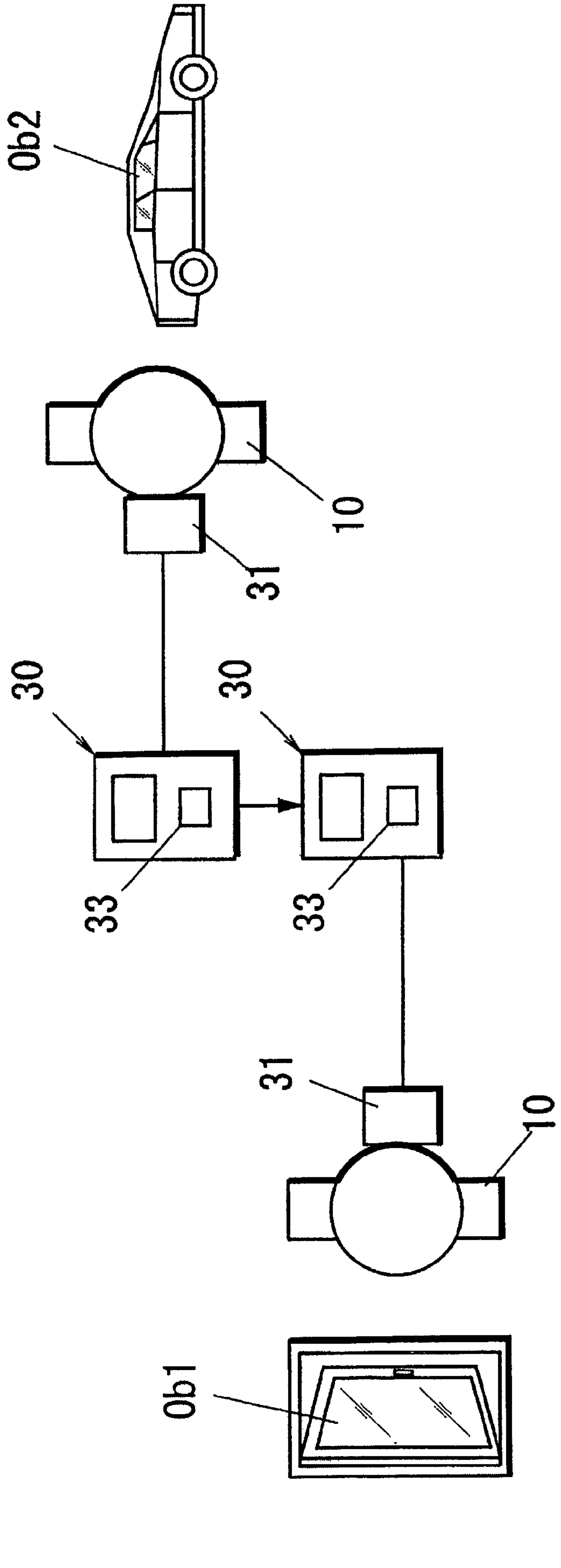
FIG. 7 is a schematic construction diagram showing an exemplary use of the system.

Now, it is assumed that the electronic key 10 for locking and unlocking the locking mechanism 29 of the car Ob2 is newly obtained in addition to the electronic key 10 for locking and unlocking the locking mechanism 29 of the house Ob1 as shown in FIG. 7. In such a case, the person M comes to own two electronic keys 10 since the electronic key 10 for the car Ob2 is added to the electronic key 10 for the house Ob1. If a single electronic key 10 can be used for both the house Ob1 and the car Ob2, it is not necessary to look for the electronic keys 10 compatible with the respective objects Ob, thereby improving convenience and making it more convenient to carry the electronic key 10 around. To this end, the identification data of the electronic key 10 for the car 0b2 needs to be written in the electronic key 10 for the house Ob1 (relationship between the car Ob2 and the house Ob1 may be reversed). In other words, two identification data corresponding to the house Ob1 and the car Ob2 are registered in one electronic key 10. As described above, when a plurality of identification data are registered in the electronic key 10, the locking mechanism 29 is locked or unlocked in the electronic locking apparatus 20 if there is any identification data having such a relationship with the key data registry in the electronic locking apparatus 20 to satisfy the specified condition. Thus, if different key data are set for the house Ob1 and the car Ob2 in the electronic locking apparatus 20, the house Ob1 and the car Ob2 can be locked and unlocked by the single electronic key 10 in which two identification data are registered.

Figure 8:
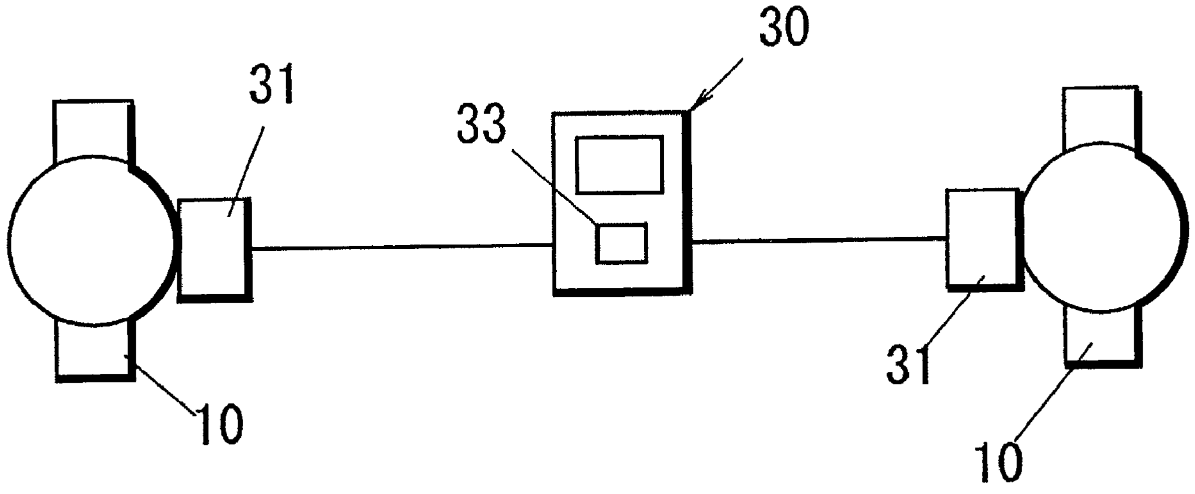
FIG. 8 is a schematic construction diagram showing another exemplary use of the system.

In this embodiment, the data transferring device 32 is so constructed as to send the read command to the electronic key 10 and temporarily save the read identification data when being instructed to read by means of the operation portion 33 and to write the identification data in another electronic key 10 when being instructed to write by means of the operation portion 33. Contrary to this, as shown in FIG. 8, two electronic keys 10 may be made connectable with the reader/writer 30, the data transferring device 32 may send the read command to one electronic key 10 to read the identification data, and transfer and write the read identification data to and in the other electronic key 10 when being instructed to transfer by means of the operation portion 33. In this construction, the identification data can be transferred between the two electronic keys 10 only by operating the operation portion 33 once, thereby making the reader/writer 30 more easily operable.

Figure 9:
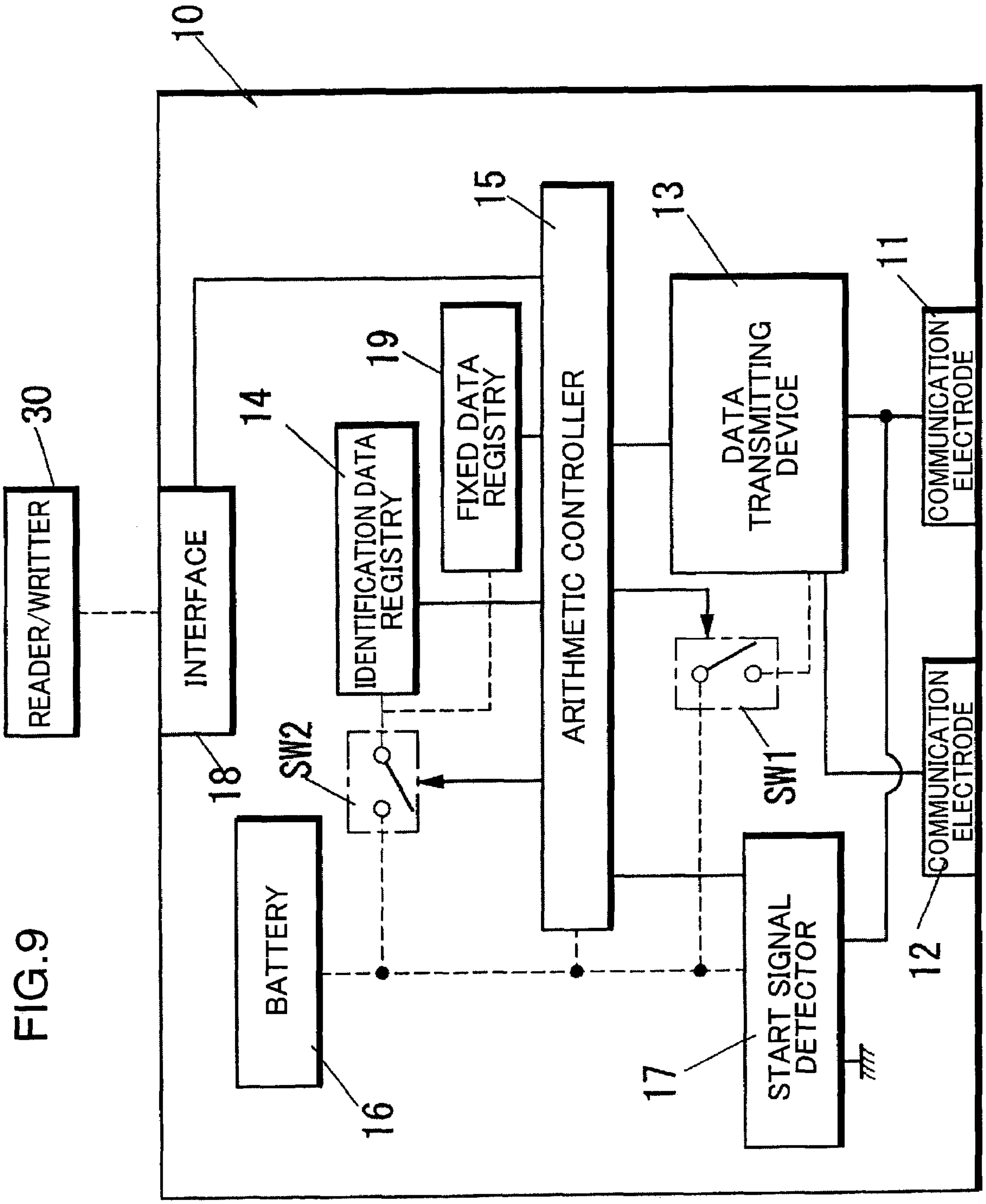
FIG. 9 is a block diagram of an electronic locking apparatus according to a first modification.
Figure 10:
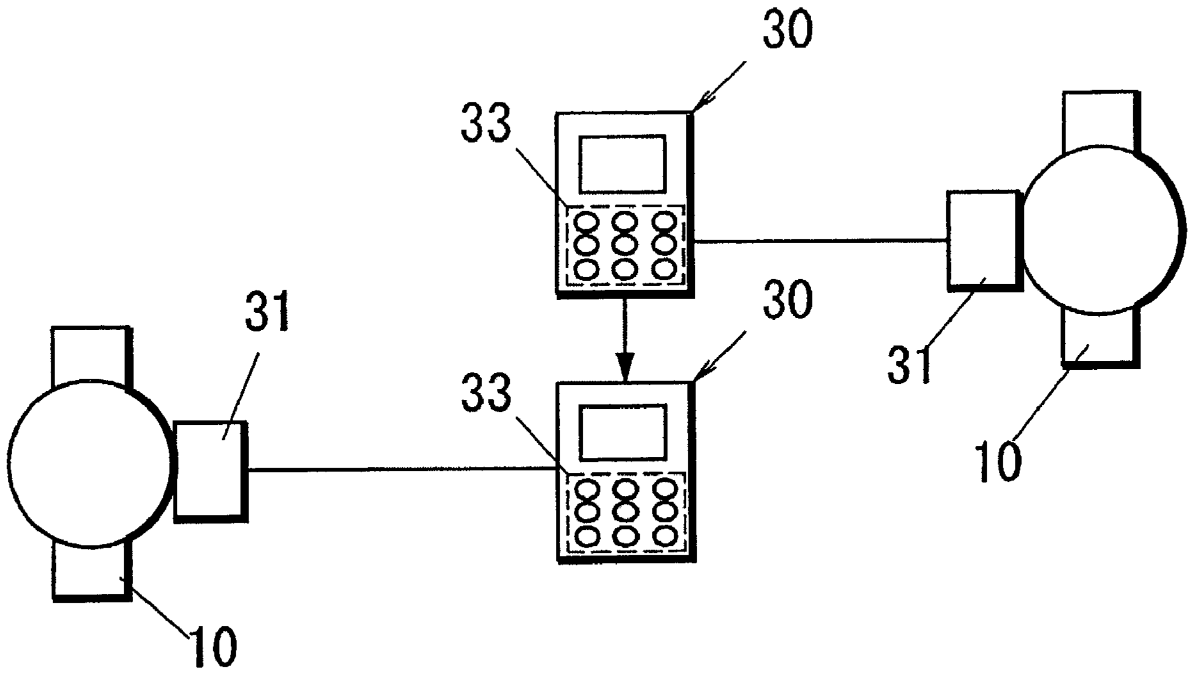
FIG. 10 is a schematic construction diagram showing an exemplary use of the first modified system.

Next, a first modification will be described with reference to FIGS. 9 and 10. It should be noted that parts or members having functions or features identical to the foregoing embodiment are indicated at like numerals and characters to omit detailed description of them. In this modification, unlike the foregoing embodiment in which the identification data is read from the electronic key 10 by sending the read command from the reader/writer 30 to the electronic key 10, an electronic key 10 is provided with a fixed data registry 19 in which a production number data of the electronic key 10 is registered as shown in FIG. 9, and the identification data is transferable from the electronic key 10 to a reader/writer 30 when the production number data inquired by the reader/writer 30 coincides with the production number data registry in the fixed data registry 19. Accordingly, an operation portion 33 of the reader/writer 30 of this modification is, as shown in FIG. 10, provided with a plurality of push-button switches like a tenkey enabling the input of the production number data (circles shown in the operation portion 33 are push-button switches in FIG. 10). In this construction, since the identification data cannot be read from the electronic key 10 unless the production number data of the electronic key 10 is inputted by the reader/writer 30, there is less possibility that the identification data is inadvertently read.

Further, when the production number data inquired by the reader/writer 30 coincides with the production number data registry in the fixed data registry 19, an arithmetic controller 15 of the electronic key 10 writes the identification data sent from the reader/writer 30 in a identification data registry 14. Accordingly, in this modification, the reader/writer 30 cannot write the identification data in the identification data registry

14 of the electronic key 10 unless the production number data of the electronic key 10 is inputted from the reader/writer 30. Thus, there is less possibility that the identification data is inadvertently written or overwritten.

The production number data in this modification is one example of identifiers allotted to individual identification data in order to permit the reading and writing of the identification data.

Although the production number data registry in the fixed data registry 19 is generally not replaceable, the reader/writer 30 may be constructed such that not only the identification data, but also the production number data are transferable between the two electronic keys 10. In such a case, no identification data is registered in the identification data registry 14, and the production number data and the identification data can be registered in a blank key having no production number data registry in the fixed data registry 19. The other construction and operation are the same as in the foregoing embodiment.

Figure 11:
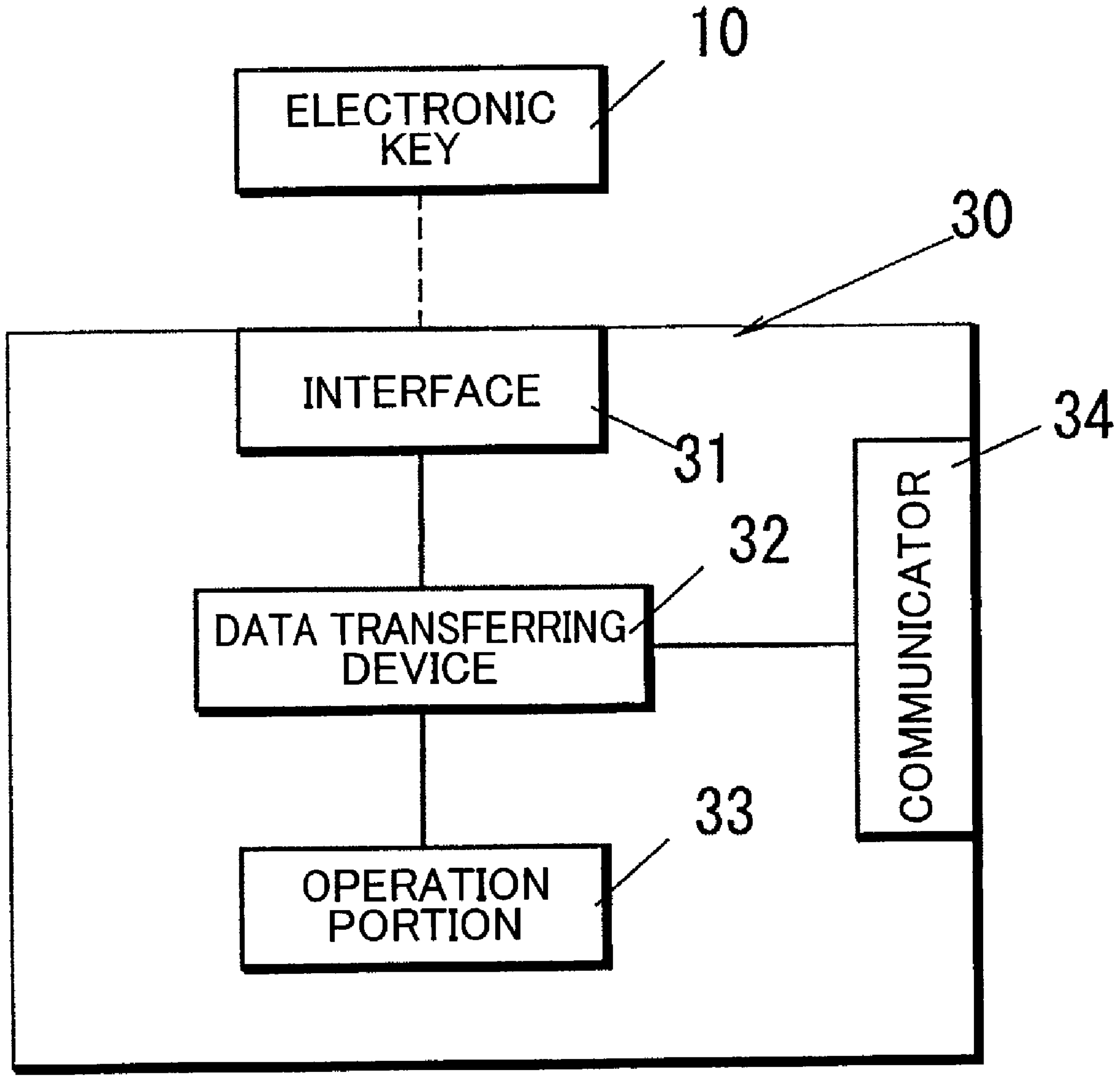
FIG. 11 is a block diagram showing a construction of a reader/writer according to a second modification.
Figure 12:
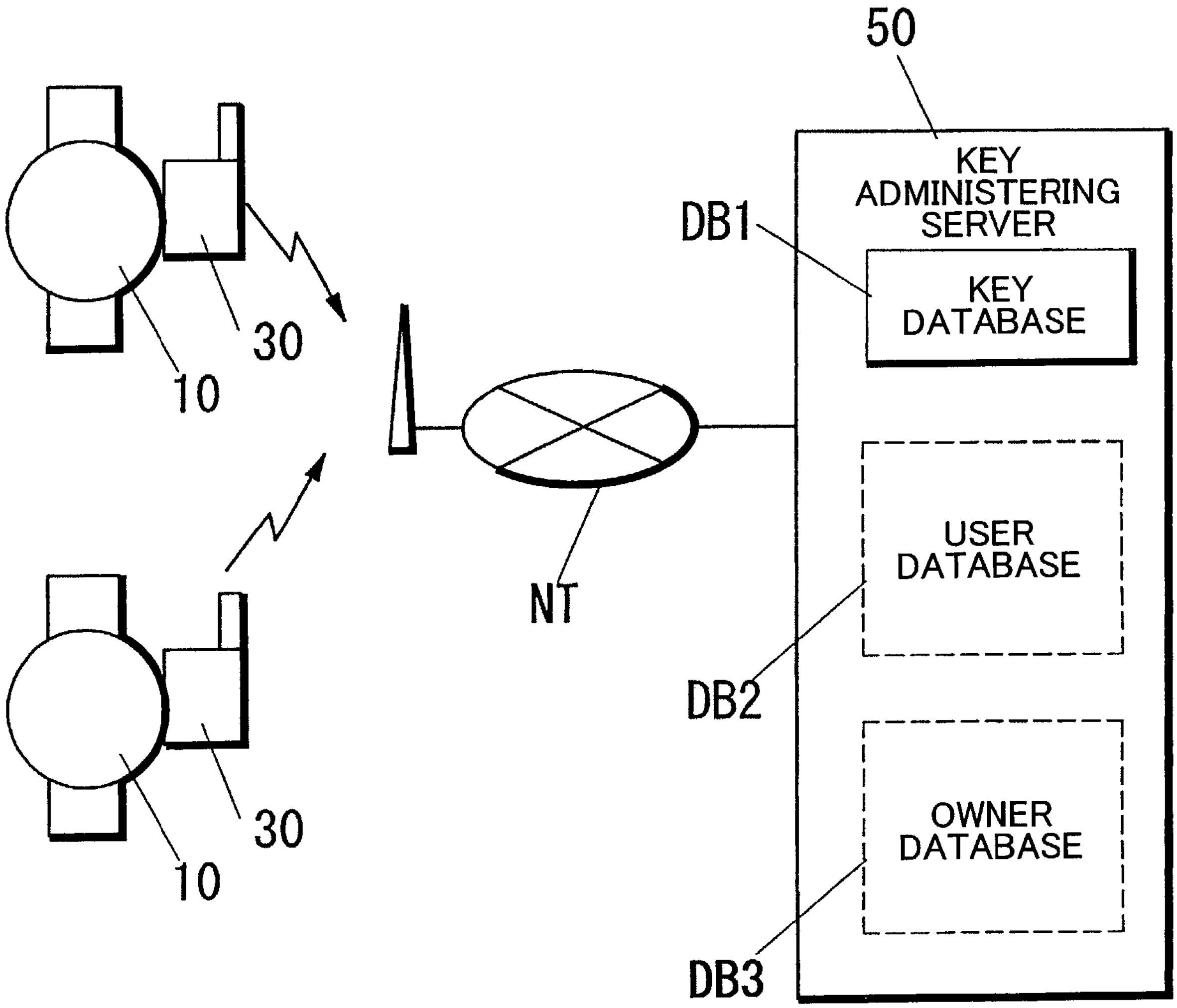
FIG. 12 is a schematic construction diagram showing an exemplary use of the second modified system.

Referring to FIGS. 11 and 12, a second modification will be described. Similarly to the first modification, parts or members having functions or features identical to the foregoing embodiment are indicated at like numerals and characters to omit a detailed description of them.

In the foregoing embodiment, the reader/writer 30 is connectable only with the electronic key 10. In this modification, however, a reader/writer 30 is provided with a communicator 34 as shown in FIG. 11 and transmits and receives data to and from a key administering server 50 via the communicator 34 as shown in FIG. 12. It does not matter whether a communication network NT of the communicator 34 is wired or wireless provided that it is capable of data transmission. In this modification, a mobile phone (including PHS) is used as the communication network NT. The mobile phone and the data transferring device 32 are connected by a connection cable or the like. A network such as the Internet may be used as a form of connection between the communication network NT and the key administering server 50. However, the key administering server 50 and the reader/writer 30 may not be connected via network.

The key administering server 50 is provided with a key database DB1 in which pairs of production number data and identification data of a plurality of electronic keys 10 can be registered. Data are registered in the key database DB1 by a distributor when a facility or equipment using the electronic key 10 is purchased. Specifically, the distributor can access the key administering server 50 by way of an unillustrated terminal, and registers the production number data of the electronic key 10 belonging to the facility or equipment and the identification data corresponding to the key data of the electronic locking apparatus 20 belonging to the facility or equipment in the key database DB1 upon selling the facility or equipment. Thus, pairs of the production number data and the identification data are registered in the key database DB1.

On the other hand, similarly to the first modification, the operation portion 33 of the reader/writer 30 enables the input of the production number data. When the production number data is inputted by means of the operation portion 33 of the reader/writer 30 with the reader/writer 30 connected with the key administering server 50 via the communication network NT, the identification data paired with the inputted production number data is read from the key database DB1 and written in the identification data registry 14 of the electronic key 10.

As described above, in this modification, the distributor registers the pair of the production number data and the identification data in the key database DB1 upon selling the facility or equipment to be locked and unlocked by the electronic key 10. Thus, a user of the electronic key 10 can access the key database DB1 by connecting the electronic key 10 with the reader/writer 30 and transfer the identification data to the electronic key 10 using the production number data. In this way, the identification data is registered in the key administering server 50 and directly written in the electronic key 10 in this modification. Thus, the possibility of leaking the identification data can be reduced by making the identification data unknown even to the user. Further, since the access right to access the key database DB1 is restricted by the production number data, this also serves to prevent the leakage of the identification data. The other construction and operation are substantially the same as the foregoing embodiment.

Although the mobile phone is used as the communicator 34 in this modification, the reader/writer 30 may be incorporated into the mobile phone. In such a case, the interface 31 corresponds to a connection connector of the mobile phone; the data transferring device 32 to an internal circuit such as a microprocessor for controlling the operation of the mobile phone; the operation portion 33 to keys used to input the telephone number of the mobile phone and alphabets; and the communicator 34 to a transmitting/receiving device for the communication of the mobile phone. By incorporating the reader/writer into the mobile phone, communication with the key administering server 50 is possible at any place within a communication range of the mobile phone and production costs are lower as compared to a case where the reader/writer is singly produced. Alternatively, the reader/writer 30 may be incorporated into a personal computer (PC) connectable with a communication network. In such a case, the interface 31 corresponds to an interface of the PC such as a serial interface, a parallel interface or a USB interface; the data transferring device 32 to an internal circuit such as a microprocessor for controlling the operation of the PC; the operation portion 33 to an input device such as a keyboard or a mouse of the PC; and the communicator 34 to a modem for enabling a communication via a telephone circuit, a DSU for enabling a communication via a digital communication network, or the like. By incorporating the reader/writer into the PC in this way, various functions of the reader/writer can be easily programmed and production costs are lower as compared to a case where the reader/writer is singly produced.

In this modification, an operation key for regulating communication with the key administering server 50 may be used. Specifically, the electronic key 10 is further provided with an operation key registry for storing an operation key of the electronic key 10, and the key administering server 50 is so constructed as to be capable of communication with the reader/writer 30 upon receiving this operation key. In the case of trying to start a communication between the reader/writer 30 and the key administering server 50, the production number data is inputted by means of the operation portion 33 of the reader/writer 30. Upon the input of the production number data, it is sent from the reader/writer 30 to the electronic key 10, and the arithmetic controller 15 of the electronic key 10 compares the production number data from the reader/writer 30 and the one registered in the fixed data registry portion 19, and returns the operation key to the reader/writer 30 if the two data coincide. Then, the reader/writer 30 establishes the communication with the key administering server 50 using this operation key, and transfers the identification data to the electronic key 10 using the production number data as described above. Since this operation key is necessary in the case of making it possible for the reader/writer 30 to communicate with the key administering server 50, it does not matter whether the operation key is saved in the reader/writer 30 or erased after the completion of the communication. Further, it does not particularly matter how the communication between the reader/writer 30 and the key administering server 50 is established. The established communication may be a software communication using, for example, a password in which communication no response is given unless the key administering server 50 receives the operation key from the reader/writer 30 even if a circuit between the reader/writer 30 and the key administering server 50 is connected, or a hardware communication in which the communicator 34 is not driven unless the reader/writer 30 receives the operation key from the electronic key 10. By taking the above construction, the reader/writer 30 cannot communicate with the key administering server 50 unless obtaining the operation key from the electronic key 10. Thus, the safety of the identification data registry in the key database DB1 can be improved.

Although the production number of the electronic key 10 is registered in the key database DB1 while being paired with the identification data in this modification, the production number of the electronic locking apparatus 20 may be registered while being paired with the identification data. Since this construction enables the identification data corresponding to the production number of the electronic locking apparatus 20 to be obtained, the electronic key can be easily duplicated and newly stored even if the production number of the electronic key becomes unknown, for example, upon losing the electronic key or a new identification data is stored in the electronic key 10 not registered in the key database DB1.

In the case of registering a data in a blank key whose production number data is not registered in the fixed data registry portion 19, the production number data is first registered in the fixed data registry portion 19 and then the identification data is read from the key database DB1.

Although the identification data is transferred to the electronic key 10 by inquiring the key database DB1 for the production number data in this modification, the key administering server 50 may be, as shown in broken lines in FIG. 12, additionally provided with a user database DB2 in which an individual information of a user of the electronic key 10 is registered in the case that the production number of the electronic key 10 is registered in the key database DB1 while being paired with the identification data in order to further improve safety against the leakage of the identification data. In the case that the production number of the electronic locking apparatus 20 is registered in the key database DB1 while being paired with the identification data, the key administering server 50 may be additionally provided with an owner database DB3 in which an individual information of an owner of the electronic locking apparatus 20 is registered. In the owner database DB2 or the owner database DB3, name, age, sex, address, telephone number and the like are registered as the individual information of the user or owner. In the case that the user database DB2 or the owner database DB3 is provided, the input of at least one item of the individual information is urged to be made by means of the operation portion 33 of the reader/writer 30 when an access is made from the reader/writer 30 to the key administering server 50, and an access to the key database DB1 is permitted when the content of the inputted item coincides with the content registered in the user database DB2 or the owner database DB3. The item to be inputted from the reader/writer 30 may be fixedly set beforehand or may be changed every time the key administering server 50 is accessed. Since the access to the key database DB1 is permitted upon confirming the individual information of the user or the owner in this way, the access right is restricted by the individual information of the user or the owner and the production number data upon reading the identification data from the key database DB1. As a result, a better effect of preventing the leakage of the identification data can be obtained.

Figure 13:
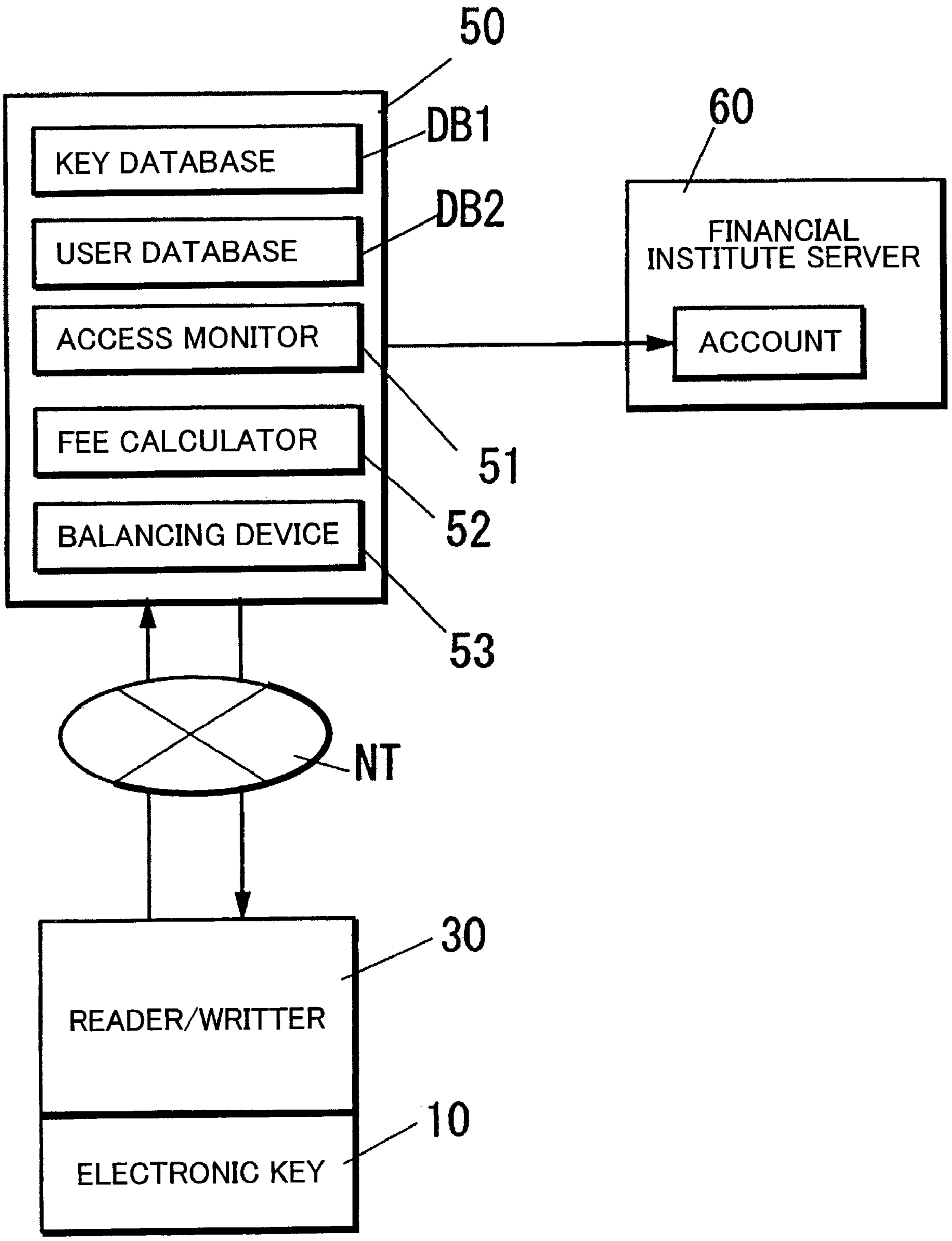
FIG. 13 is a schematic construction diagram showing an exemplary use of a third modified system.

A third modification will be described with reference to FIG. 13. Similarly to the foregoing embodiments, like parts and members are given the same numbers or characters. In this modification, a key administering server 50 is, as shown in FIG. 13, provided with an access monitor 51 for monitoring an access of each user registered in a user database DB2 to a key database DB1, and a fee calculator 52 for calculating a fee based on the access of each user at every interval of a predetermined period. The key administering server 50 is also provided with a balancing device 53 which is capable of communication with a financial institute server 60 of a financial institute where each user has an account and adapted to automatically collect a fee calculated by a fee calculator 52 from the financial institute server 60. In other words, information on the user's account is registered in the user database DB2 in addition to his name, age, sex, etc.

The fee calculator 52 may be so constructed as to calculate not only the fee based on the access to the key database DB1, but also a rental fee in the case that the object Ob is rented.

In this modification, the operation cost of the key administering server 50 can be raised by charging the access to the key administering server 50, and the fee is automatically collected from the financial institute. Thus, the administrator of the key administering server 50 can automatically collect the fee based on the access to the key database DB1. The other construction and operation are the same as those of the second modification.

Figure 14:
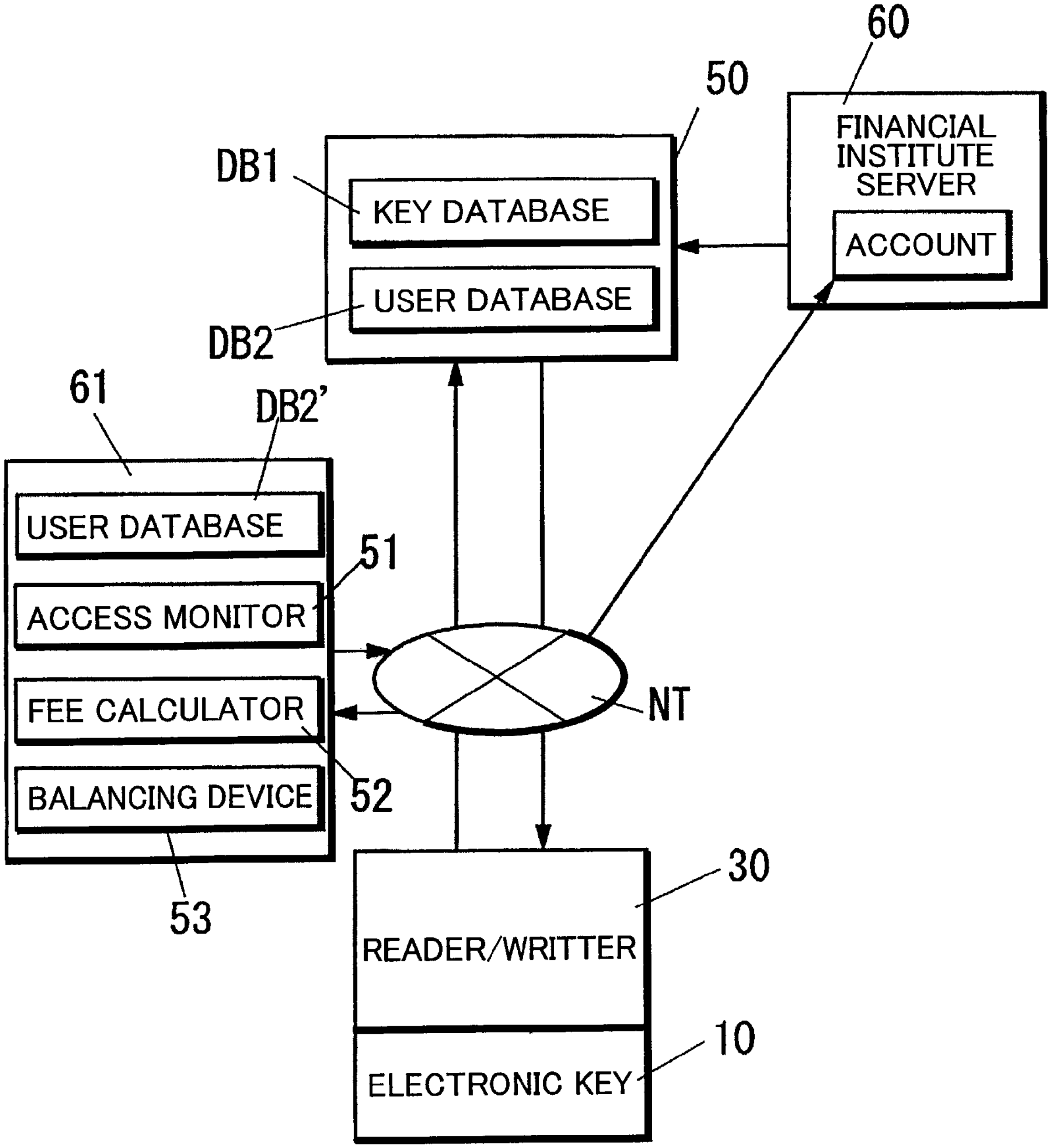
FIG. 14 is a schematic construction diagram showing an exemplary use of a fourth modified system.

A fourth modification will be described with reference to FIG. 14. Similarly to the foregoing embodiments, like parts and members are given the same numbers or characters. In this modification, an access monitor 51, a fee calculator 52 and a balancing device 53 are provided not in a key administering server 50, but in a carrier server 61 run by a communication service company providing the communication network NT as shown in FIG. 14. Specifically, the access monitoring, fee calculation and balancing are executed by the carrier server 61. Further, similarly to the key administering server 50, the carrier 61 is provided with a user database DB3, in which information on the user's account as well as his name, age and sex are registered. The fee calculator 52 provided in the carrier server 61 calculates not only the fee of the key database DB1 provided in the key administering server 50, but also the fee of the communication network NT, and the balancing device 53 collects both fees from the financial institute server 60. Since the key database DB1 is provided in the key administering server 50, the fee of the key database DB1 calculated by the fee calculator 52 is notified to the key administering server 50 by the balancing device 53 in the carrier server 61.

In this modification, not only the fee based on the access to the key database DB1 can be automatically connected, but also the collection of the fee can be executed by the communication service company. Thus, the administrator of the key administering server 50 is less burdened with the collection of fee. The other construction and operation of the fourth modification are the same as those of the third modification.

Although a common electronic key is used as a house key and a car key in the foregoing embodiment and modifications described above, the kinds of objects provided with a locking mechanism to be locked and unlocked by a key are not restricted to those illustrated. Further, although the illustrated electronic key is attachable to a person, the electronic key may be such that an IC chip is embedded in a card key or the like having a conventional key or card shape and including a blade insertable into a keyhole. In the case of using the electronic keys of the forms other than the one used in the foregoing embodiment and modifications, a known technique is suitably adopted for a signal transmission path and a signal format in reading an identification data registry in the electronic key by an electronic locking apparatus.

In the above-described embodiment and modifications, the electronic key 10 having the wristwatch-shaped casing 40 as shown in FIG. 6 is illustrated as an example. However, the electronic key 10 may have such a ring-shaped casing or such a bracelet-shaped casing that the communication electrodes 11 and 12 directly touch the body of the person M without touching each other.

Further, the electronic key 10 transmits all the identification data stored in the identification data registry 14 when the person M wearing the electronic key 10 touches the touch electrode 21 of the electronic locking apparatus 20 in the case that a plurality of identification data are registered in the identification data registry 14. However, the present invention is not limited to this.

For example, the electronic key 10 may be provided with a key selecting device, and the identification data selected by the key selecting device may be transmitted to the electronic locking apparatus 20. More specifically, the key selecting device is formed by two push-button switches connected with the arithmetic controller 25, and the arithmetic controller 25 cyclically successively selects the identification data from a plurality of identification data stored in the identification data registry 14 every time the first push-button switch is pushed while transmitting the selected identification data when the second push-button switch is pushed. The electronic key 10 may be further provided with a display device such as a LCD for displaying the order of the identification data. By this construction, the electronic key 10 transmits only the corresponding identification data to the electronic locking apparatus 20. Thus, there is no possibility that the other identification data are tapped when the transmission signal is tapped. Therefore, the security is improved as compared to a case where all the identification data are transmitted.

Alternatively, the electronic locking apparatus 20 may be, for example, so constructed as to request the identification data corresponding to the electronic key 10. More specifically, identifiers for identifying the respective identification data are allotted, and the identification data of the electronic locking apparatus 20 and the identifier allotted to this identification data are stored in the key data storage 24 of the electronic locking apparatus 20, and the identification data and the identifier allotted thereto are registered in correspondence in the identification data registry 14. Upon an output from the touch electrode 21, the electronic locking apparatus 20 first transmits the identifier allotted to its own identification data to the electronic key 10, and the electronic key 10 searches the identification data corresponding to this identifier in the identification data registry 14 and transmits the found identification data back to the electronic locking apparatus 20. For example, an identifier "1" is allotted to an identification data "ABC" of a car key; an identifier "2" to an identification data "DEF" of a house key; and an identifier "3" to an identification data "GHJ" of a bicycle key. The electronic locking apparatus 20 of the car transmits the identifier "2" to the electronic key 10 upon the reaction of the touch electrode 21, and the electronic key 10 transmits the identification data "ABC" corresponding to the identifier "1" back. By this construction, the electronic key 10 transmits only the corresponding identification data to the electronic locking apparatus 20. Thus, there is no possibility that the other identification data are tapped when the transmission signal is tapped. Therefore, security is improved as compared to a case where all the identification data are transmitted. Further, the user of the electronic key 10 needs not select the identification data to be transmitted corresponding to the electronic locking apparatus 20 by means of the key selecting device as above.

As described above, an inventive electronic key is used with an electronic locking apparatus, and is provided with: an identification data registry which stores one or more identification data for locking and unlocking; a data transmitter which transmits identification data to an electronic locking apparatus; an interface which serves as an interface for writing and reading of identification data into and from the identification data registry portion; and an electronic key controller which controls communication between the electronic locking apparatus and the data transmitter for locking and unlocking of the electronic locking apparatus, and transfer of identification data between the identification data registry portion and the interface for reading and writing of identification data.

The electronic key controller may allow transfer of identification data from the identification data registry to the interface upon a request of reading of the identification data to the interface.

It may be preferable to further provide the electronic key with a fixed data registry which stores an identifier for regulating the writing and reading of identification data.

The interface may be operable to receive an identifier. It may be preferable that the electronic key controller allows transfer of identification data from the identification data registry to the interface when the received identifier coincides with the identifier stored in the fixed data registry.

Also, the interface may be operable to receive identification data and an identifier. It may be preferable that the electronic key controller allows transfer of the received identification data from the interface to the identification data registry when the received identifier coincides with the identifier stored in the fixed data registry.

The electronic key may be preferably provided with an operation key registry which stores an operation key for regulating communication with a key administering server including a key database which stores a pair of identification data and an identifier. In this case, the interface is operable to receive identification data and an identifier. The electronic key controller allows transfer of the operation key from the operation key registry to the interface when the received identifier coincides with the identifier stored in the fixed data registry.

The identifier may be preferably a production number given to a corresponding electronic key. Alternatively, the identifier may be preferably a production number given to a corresponding electronic locking apparatus.

The electronic key may be preferably provided with a detector which detects a start signal from the electronic locking apparatus. In this case, the data transmitter includes a data transmitting device for transmitting identification data while modulating the data, and a communication electrode for outputting the modulated signal. The detector receives the start signal via the communication electrode. The electronic key controller suspends supplying of power to the identification data registry and the data transmitting device until the detector detects the start signal.

The electronic key may be preferably provided with a timer which outputs a time-up signal to the electronic key controller upon the lapse of a predetermined time. The electronic key controller starts supplying of power to the identification data registry and the data transmitting device when the detector detects the start signal, and suspends supplying of power to the identification data registry and the data transmitting device after the timer outputs the time-up signal.

An inventive electronic locking apparatus is used with an electronic key operable to generate an identification data. The electronic locking apparatus comprises: a locking mechanism for achieving locking and unlocking; a key data storage which stores a key data having a predetermined relationship with the identification data of the electronic key corresponding to the electronic locking apparatus; a data receiver which receives an identification data from an electronic key; and an electronic locking apparatus controller which effects locking and unlocking of the locking mechanism when the received identification data satisfies the predetermined relationship with the key data stored in the key data storage.

The electronic locking apparatus may be preferably provided with a detector which detects contact of a person to output a detection signal to the electronic locking apparatus controller. In this case, the data receiver may be provided with a touch electrode to which a person makes contact to input an identification data in the form of a modulated signal; and a data receiving device which receives the inputted identification data and demodulates the identification data. The electronic locking apparatus controller suspends supplying of power to the key data storage and the data receiving device until the detector detects the contact of the person.

The electronic locking apparatus may be further provided with a generator which generates a start signal for activating an electronic key and outputs it via the touch electrode.

The electronic locking apparatus may be further provided with a timer which outputs a time-up signal to the electronic locking apparatus controller upon the lapse of a predetermined time after the generation of the start signal. In this case, the electronic locking apparatus controller starts supplying of power to the key data storage and the data receiving device when the detector detects the contact of the person, and suspends supplying of power to the key data storage and the data receiving device when the time-up signal is outputted from the timer.

An inventive electronic security system comprises the inventive electronic key, and the inventive electronic locking apparatus, and a reader/writer for reading and writing the identification data in and from the identification data registry.

The reader/writer may be provided with a data reading/writing device for writing an identification data read from one electronic key into another electronic key.

It may be preferable that the data transmitter of the electronic key includes two communication electrodes which makes contact with a person, and the data receiver of the electronic locking apparatus includes a touch electrode which a person made contact with the electronic key touches.

The electronic security system may be preferably provided with a key administering server including a key database which stores a pair of an identification data and an identifier for regulating reading and writing of the identification data. In this case, the reader/writer may be further provided with a communicator which establishes communication with the key administering server via a communication network; an operation portion for inputting an identifier; and a data reading/writing device for reading an identification data from the key database and writing the read identification in the identification data registry of an electronic key if the identifier inputted by the operation portion coincides with an identifier paired with the identification data stored in the key database.

The key administering server may be further provided with a user database which stores user information concerning a user of each electronic key. In this case, the operating portion is operable to input user information, and the data reading/writing device reads an identification data from the key database and writes the read identification in the identification data registry of an electronic key if the identifier inputted by the operation portion coincides with an identifier paired with the identification data stored in the key database, and user information inputted by the operation portion coincides with the user information stored in the user database.

The key administering server may be further provided with an access monitoring device which monitors an access of each user registered in the user database to the key database; a fee calculating device which calculates a fee based on the access of each user at every interval of a predetermined time; and a balancing device which is capable of communication with a financial institute server of a financial institute where the user has an account, and automatically collects the fees calculated by the fee calculating device from the financial institute server.

The communication network may be provided with a carrier server of a communication service company providing the communication network between the reader/writer and the key administering server. The carrier server includes an access monitoring device which monitors an access of each user registered in the user database to the key database; a fee calculating device which calculates a fee based on the access of each user at every interval of a predetermined time; and a balancing device which is capable of communication with a financial institute server of a financial institute where the user has an account, and automatically collects the fees calculated by the fee calculating device from the financial institute servers, and notifies the calculated fee to the key administering server.

The key administering server may be further provided with an owner database which stores owner information concerning an owner of each electronic locking apparatus. In this case, the operating portion is operable to input owner information, and the data reading/writing device reads an identification data from the key database and writes the read identification in the identification data registry of an electronic key if the identifier inputted by the operation portion coincides with an identifier paired with the identification data stored in the key database, and owner information inputted by the operation portion coincides with the owner information stored in the owner database.

An inventive key administering server comprises a key database which stores a pair of identification data for regulating locking and unlocking of an electronic locking apparatus and an identifier for regulating reading and writing of the identification data in an electronic key corresponding to the electronic locking apparatus.

The key administering server may be further provided with an access monitoring device which monitors an access of each key user to the key database; a fee calculating device for calculating a fee based on the access of each user at every interval of a predetermined time; and a balancing device which is capable of communication with a financial institute server of a financial institute where the user has an account, and automatically collects the fees calculated by the fee calculating device from the financial institute server.

This application is based on patent application No. 2001-401544 filed in Japan, the contents of which are hereby incorporated by references.

As this invention may be embodied in several forms without departing from the spirit of essential characteristics thereof, the present examples are therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An electronic key for use with an electronic locking apparatus, comprising:

an identification data registry which stores one or more identification data for locking and unlocking;

a data transmitter which transmits identification data to an electronic locking apparatus;

an interface which serves as an interface to write and read of identification data into and from the identification data registry;

a communication electrode connected with the data transmitter and forms a transmission path passing through a person between the communication electrode and the electronic locking apparatus;

an electronic key controller which controls communication between the electronic locking apparatus and the data transmitter to lock and unlock the electronic locking apparatus, and transfer identification data between the identification data registry and the interface to read and write of identification data, wherein the data transmitter transmits the identification data to the electronic locking apparatus via the transmission path formed by the communication electrode.

2. An electronic key according to claim 1, wherein the electronic key controller allows transfer of identification data from the identification data registry to the interface upon a request of reading of the identification data to the interface.

3. An electronic key according to claim 1, further comprising a fixed data registry which stores an identifier for regulating the writing and reading of identification data.

4. An electronic key according to claim 3, wherein the interface is operable to receive an identifier, and the electronic key controller allows transfer of identification data from the identification data registry to the interface when the received identifier coincides with the identifier stored in the fixed data registry.

5. An electronic key according to claim 3, wherein the interface is operable to receive identification data and an identifier, and the electronic key controller allows transfer of the received identification data from the interface to the identification data registry when the received identifier coincides with the identifier stored in the fixed data registry.

6. An electronic key according to claim 3, further comprising an operation key registry which stores an operation key for regulating communication with a key administering server including a key database which stores a pair of identification data and an identifier, wherein the interface is operable to receive identification data and an identifier, and the electronic key controller allows transfer of the operation key from the operation key registry to the interface when the received identifier coincides with the identifier stored in the fixed data registry.

7. An electronic key according to claim 3, wherein the identifier includes a production number given to a corresponding electronic key.

8. An electronic key according to claim 3, wherein the identifier includes a production number given to a corresponding electronic locking apparatus.

9. An electronic key according to claim 1, further comprising a detector which detects a start signal from the electronic locking apparatus, wherein:

the data transmitter includes:

a data transmitting device for transmitting identification data while modulating the data; and a communication electrode for outputting the modulated signal;

the detector receives the start signal via the communication electrode; and the electronic key controller suspends supplying of power to the identification data registry and the data transmitting device until the detector detects the start signal.

10. An electronic key according to claim 9, further comprising a timer which outputs a time-up signal to the electronic key controller upon the lapse of a predetermined time, wherein the electronic key controller starts supplying of power to the identification data registry and the data transmitting device when the detector detects the start signal, and suspends supplying of power to the identification data registry and the data transmitting device after the timer outputs the time-up signal.

11. An electronic locking apparatus for use with an electronic key operable to generate an identification data, comprising:

a locking mechanism to achieve locking and unlocking;

a key data storage which stores a key data having a predetermined relationship with the identification data of the electronic key corresponding to the electronic locking apparatus;

a data receiver which receives an identification data from an electronic key;

a touch electrode connected with the data receiver and forms a transmission path passing through a person between the touch electrode and the electronic key; and an electronic locking apparatus controller which effects locking and unlocking of the locking mechanism when the received identification data satisfies the predetermined relationship with the key data stored in the key data storage, wherein the data receiver receives the identification data from the electronic key via the transmission path formed by the touch electrode.

12. An electronic locking apparatus according to claim 11, further comprising a detector that detects contact of a person to output a detection signal to the electronic locking apparatus controller, wherein the data receiver includes:

the touch electrode to which a person makes contact to input an identification data in the form of a modulated signal; and a data receiving device which receives the inputted identification data and demodulates the identification data, and wherein the electronic locking apparatus controller suspends supplying of power to the key data storage and the data receiving device until the detector detects contact of the person.

13. An electronic locking apparatus according to claim 12, further comprising a generator which generates a start signal for activating an electronic key and outputs it via the touch electrode.

14. An electronic locking apparatus according to claim 13, further comprising a timer which outputs a time-up signal to the electronic locking apparatus controller upon the lapse of a predetermined time after the generation of the start signal, wherein the electronic locking apparatus controller starts supplying of power to the key data storage and the data receiving device when the detector detects the contact of the person, and suspends supplying of power to the key data storage and the data receiving device when the time-up signal is outputted from the timer.

15. An electronic security system, comprising:

an electronic key and an electronic locking apparatus, wherein the electronic key includes:

an identification data registry which stores one or more identification data for locking and unlocking;

a data transmitter which transmits identification data to an electronic locking apparatus;

an interface which serves as an interface for writing and reading of identification data into and from the identification data registry; and an electronic key controller which controls communication between the electronic locking apparatus and the data transmitter, and transfer of identification data between the identification data registry and the interface, wherein the electronic locking apparatus includes:

a locking mechanism for locking and unlocking;

a key data storage which stores a key data having a predetermined relationship with an identification data of an electronic key corresponding to the electronic locking apparatus;

a data receiving device which receives an identification data from the electronic key;

an electronic locking apparatus controller which effects locking and unlocking of the locking mechanism when the received identification data satisfies the predetermined relationship with the key data stored in the key data storage; and a reader/writer which reads and writes the identification data in and from the identification data registry, and wherein a transmission path is formed between communication electrodes, a key bearer, and a touch electrode that permits the data receiving device to receive identification data from the electronic key.

16. An electronic security system according to claim 15, wherein the reader/writer includes a data reading/writing device for writing an identification data read from one electronic key into another electronic key.

17. An electronic security system according to claim 15, wherein the data transmitter of the electronic key includes two communication electrodes which makes contact with a person, the data receiver of the electronic locking apparatus includes a touch electrode which a person made contact with the electronic key touches.

18. An electronic security system according to claim 15, further comprising a key administering server including a key database which stores a pair of an identification data and an identifier for regulating reading and writing of the identification data, wherein the reader/writer further includes:

a communicator which establishes communication with the key administering server via a communication network; an operation portion for inputting an identifier; and a data reading/writing device for reading an identification data from the key database and writing the read identification in the identification data registry of an electronic key if the identifier inputted by the operation portion coincides with an identifier paired with the identification data stored in the key database.

19. An electronic security system according to claim 18, wherein the key administering server further includes a user database which stores user information concerning a user of each electronic key, and the operating portion is operable to input user information, and the data reading/writing device reads an identification data from the key database and writes the read identification in the identification data registry of an electronic key if the identifier inputted by the operation portion coincides with an identifier paired with the identification data stored in the key database, and user information inputted by the operation portion coincides with the user information stored in the user database.

20. An electronic security system according to claim 19, wherein the key administering server further includes:

an access monitoring device which monitors an access of each user registered in the user database to the key database;

a fee calculating device which calculates a fee based on the access of each user at every interval of a predetermined time; and a balancing device which is capable of communication with a financial institute server of a financial institute where the user has an account, and automatically collects the fees calculated by the fee calculating device from the financial institute server.

21. An electronic security system according to claim 19, wherein the communication network includes a carrier server of a communication service company providing the communication network between the reader/writer and the key administering server, and the carrier server includes:

an access monitoring device which monitors an access of each user registered in the user database to the key database;

a fee calculating device which calculates a fee based on the access of each user at every interval of a predetermined time; and a balancing device which is capable of communication with a financial institute server of a financial institute where the user has an account, and automatically collects the fees calculated by the fee calculating device from the financial institute servers, and notifies the calculated fee to the key administering server.

22. An electronic security system according to claim 18, wherein the key administering server further includes an owner database which stores owner information concerning an owner of each electronic locking apparatus, and the operating portion is operable to input owner information, and the data reading/writing device reads an identification data from the key database and writes the read identification in the identification data registry of an electronic key if the identifier inputted by the operation portion coincides with an identifier paired with the identification data stored in the key database, and owner information inputted by the operation portion coincides with the owner information stored in the owner database.

23. An electronic security system according to claim 18, wherein the identifier includes a production number given to an electronic locking apparatus which is activated by the identification data corresponding to the identifier.

* * * * *